(12) United States Patent
Kim et al.

(10) Patent No.: US 10,551,656 B2
(45) Date of Patent: Feb. 4, 2020

(54) DISPLAY DEVICE AND MULTISCREEN DISPLAY DEVICE INCLUDING THE SAME

(71) Applicant: LG DISPLAY CO., LTD., Seoul (KR)

(72) Inventors: MinJoo Kim, Paju-si (KR); IkHyun Kang, Ulsan (KR); Junghun Choi, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 43 days.

(21) Appl. No.: 15/837,521

(22) Filed: Dec. 11, 2017

(65) Prior Publication Data

US 2018/0173036 A1 Jun. 21, 2018

(30) Foreign Application Priority Data

Dec. 20, 2016 (KR) ........................ 10-2016-0174525

(51) Int. Cl.
*G06T 11/60* (2006.01)
*G02F 1/1333* (2006.01)
(Continued)

(52) U.S. Cl.
CPC .... *G02F 1/13336* (2013.01); *G02F 1/133308* (2013.01); *G02F 1/133345* (2013.01); *G02F 1/133524* (2013.01); *G09G 3/3406* (2013.01); *G09G 3/3685* (2013.01); *G02F 1/133603* (2013.01); *G02F 2001/13332* (2013.01); *G02F 2201/44* (2013.01); *G09G 2300/026* (2013.01);
(Continued)

(58) Field of Classification Search
CPC ....... G02F 1/13336–13452; G09F 9/33; G09F 13/14; B60Q 1/2696
See application file for complete search history.

(56) References Cited

U.S. PATENT DOCUMENTS 5,528,474 A * 6/1996 Roney .................. B60Q 1/2696
362/545
6,307,606 B1 * 10/2001 Takii ................. G02F 1/133514
349/106
(Continued)

FOREIGN PATENT DOCUMENTS

CN 1877682 A 12/2006
CN 10551960 A 10/2009
(Continued)

*Primary Examiner* — Lin Li
(74) *Attorney, Agent, or Firm* — Birch, Stewart, Kolasch & Birch, LLP

(57) ABSTRACT

Discussed are a display device and a multiscreen display device including the same, which conceal a bezel. The display device in one embodiment includes first to fourth edge display modules displaying an image on a bezel area overlapping each of first to fourth non-display areas of an image display module. The first to fourth edge display modules each include a flexible printed circuit board including a first cover part covering a corresponding non-display area, a second cover part bent from the first cover part and disposed on a side surface of the image display module, and a third cover part extending from the second cover part, a dot light source array including a plurality of dot light source devices provided in the first cover part, and a light source driving circuit unit provided in the third cover part and driving the dot light source devices to display an image on the bezel area.

17 Claims, 8 Drawing Sheets

(51) Int. Cl.
*G02F 1/1335* (2006.01)
*G09G 3/34* (2006.01)
*G09G 3/36* (2006.01)

(52) U.S. Cl.
CPC ... *G09G 2310/08* (2013.01); *G09G 2320/062* (2013.01); *G09G 2340/14* (2013.01); *G09G 2356/00* (2013.01)

(56) References Cited

U.S. PATENT DOCUMENTS

| | | | | |
|---|---|---|---|---|
| 8,368,729 | B2* | 2/2013 | Watanabe | G02B 3/08 |
| | | | | 345/1.3 |
| 8,472,114 | B2* | 6/2013 | Watanabe | G02B 17/0884 |
| | | | | 359/443 |
| 8,780,015 | B2* | 7/2014 | Watanabe | G02F 1/13336 |
| | | | | 345/1.3 |
| 9,140,433 | B2* | 9/2015 | Moriwaki | H04N 5/64 |
| 2007/0103632 | A1* | 5/2007 | Chen | G02F 1/13452 |
| | | | | 349/149 |
| 2009/0251921 | A1 | 10/2009 | Toussaint et al. | |
| 2012/0147068 | A1 | 6/2012 | Gondo | |
| 2014/0198251 | A1 | 7/2014 | Li | |
| 2016/0062506 | A1* | 3/2016 | Namkung | G06F 3/044 |
| | | | | 345/174 |
| 2016/0202523 | A1* | 7/2016 | Xia | G02F 1/13336 |
| | | | | 349/58 |
| 2017/0131584 | A1* | 5/2017 | Liu | G02F 1/133524 |
| 2017/0193968 | A1* | 7/2017 | Wei | G02F 1/13336 |
| 2017/0257608 | A1* | 9/2017 | Ikeda | G06T 11/60 |
| 2017/0314762 | A1* | 11/2017 | Hu | G09F 9/33 |

FOREIGN PATENT DOCUMENTS

| | | | | |
|---|---|---|---|---|
| CN | 102483907 | A | | 5/2012 |
| CN | 104123893 | | * 10/2014 | ............... G09F 9/35 |
| CN | 104123893 | A | | 10/2014 |
| JP | 2007-192977 | A | | 8/2007 |
| WO | WO 2014/110753 | A1 | | 7/2014 |
| WO | WO 2016/112873 | A1 | | 7/2016 |

* cited by examiner

DISPLAY DEVICE AND MULTISCREEN DISPLAY DEVICE INCLUDING THE SAME

CROSS-REFERENCE TO RELATED APPLICATIONS

This application claims the priority benefit of the Korean Patent Application No. 10-2016-0174525 filed on Dec. 20, 2016, which is hereby incorporated by reference as if fully set forth herein.

BACKGROUND

Field of the Invention

The present disclosure relates a display device and a multiscreen display device including the same.

Discussion of the Related Art

Recently, flat panel display devices, such as liquid crystal display (LCD) devices and organic light emitting display devices which are thin and light and have good performance such as low consumption power, are being widely used.

A related art display device includes an image display panel, a housing that accommodates the image display panel, and a front case that covers a non-display area of the image display panel. In the related art display device, since the front case is exposed to the outside, a bezel width increases due to the front case that covers a front edge of the image display panel.

Recently, multiscreen display devices where a plurality of screen devices each including the related art display device are arranged in a lattice form to implement a large display screen have been commercialized.

However, in the related art multiscreen display device, due to the front cases of a plurality of display devices, a boundary portion called a seam is provided between the display devices connected to each other. When displaying one image on the entire screen, however, the boundary portion causes a sense of discontinuity of the entire screen, causing the reduction in degree of viewing immersion of a user.

SUMMARY

Accordingly, the present disclosure is directed to provide a display device and a multiscreen display device including the same that substantially obviate one or more problems due to limitations and disadvantages of the related art.

An aspect of the present disclosure is directed to provide a display device and a multiscreen display device including the same, which conceal a bezel.

Another aspect of the present disclosure is directed to provide a multiscreen display device which conceals a boundary portion between adjacent display devices among a plurality of display devices.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a display device including first to fourth edge display modules for displaying an image on a bezel area overlapping each of first to fourth non-display areas of an image display module.

In another aspect of the present disclosure, the first to fourth edge display modules may each include a flexible printed circuit board (FPCB) including a first cover part covering a corresponding non-display area, a second cover part bent from the first cover part and disposed on a side surface of the image display module, and a third cover part extending from the second cover part, a dot light source array including a plurality of dot light source devices provided in the first cover part, and a light source driving circuit unit provided in the third cover part, the light source driving circuit unit driving the plurality of dot light source devices to display an image on the bezel area.

In another aspect of the present disclosure, the first to fourth edge display modules may each include a FPCB including a first cover part covering a corresponding non-display area and a second cover part bent from the first cover part and disposed on a side surface of the image display module, a dot light source array including a plurality of dot light source devices provided in the first cover part, and a light guider provided in the first cover part to surround a side surface of each of the plurality of dot light source devices.

In another aspect of the present disclosure, the light guider may include a light absorbing material or silicon.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
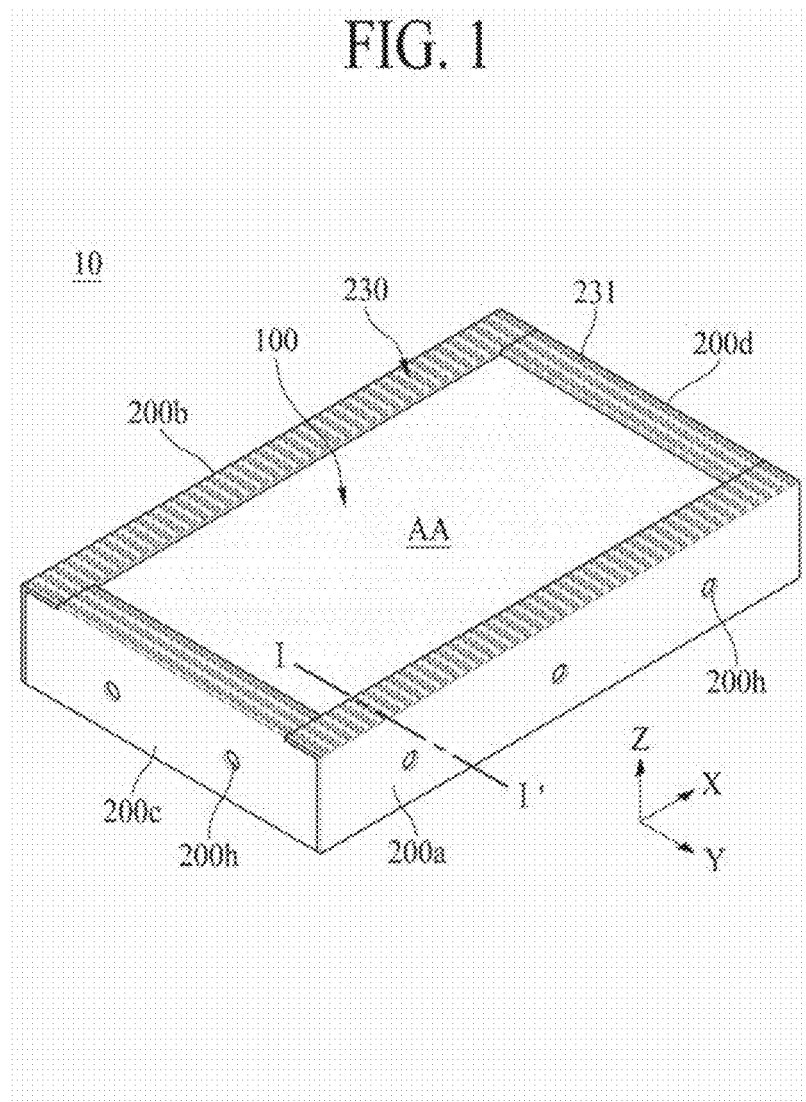
FIG. 1 is a perspective view illustrating a display device according to an embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known technology is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary. Further, the term 'may' fully encompasses all the meanings of the term 'can'.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, exemplary embodiments of a display device and a multi-screen display device using the same according to the present disclosure will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present disclosure, the detailed description may be omitted.

Figure 2:
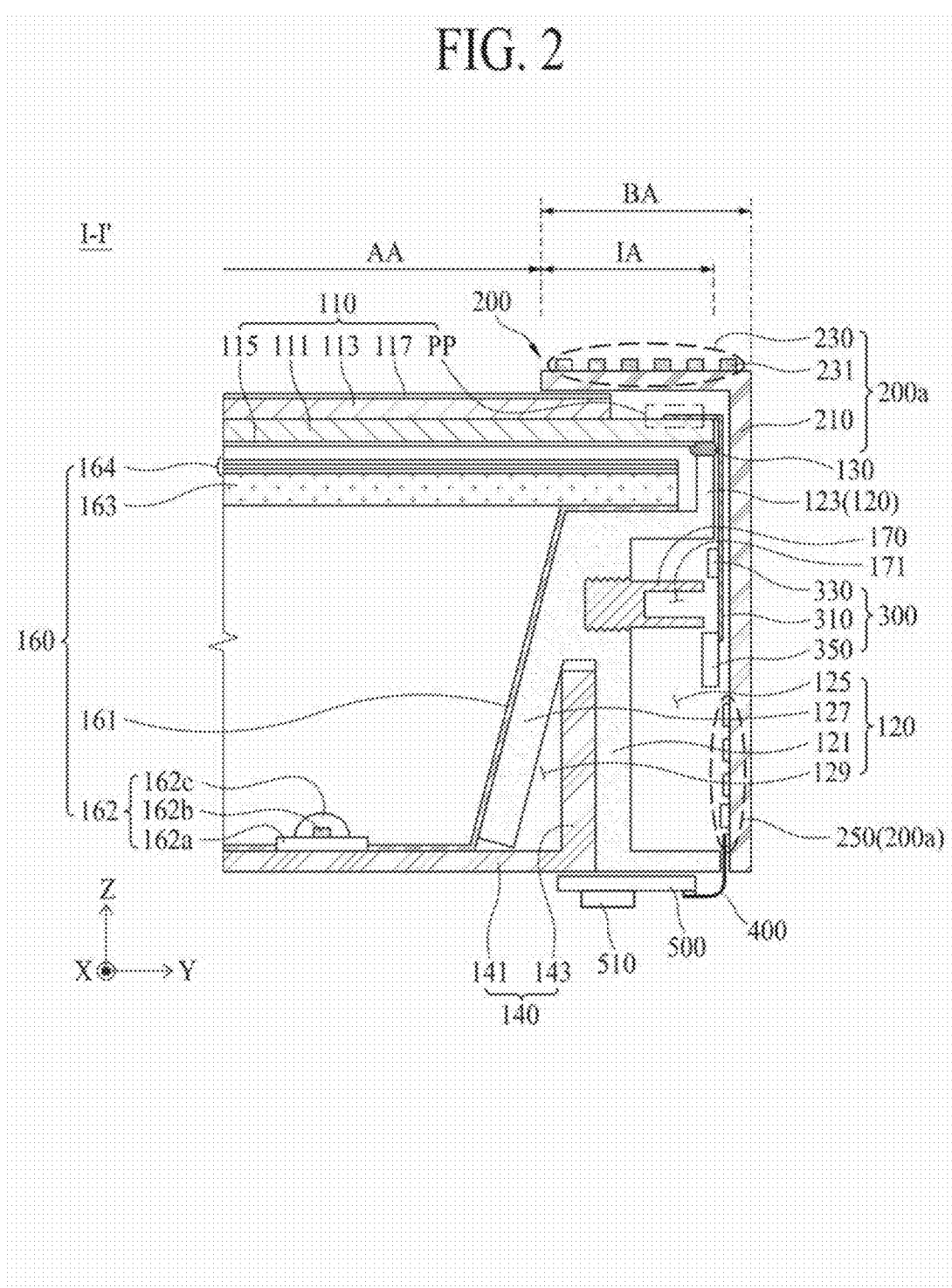
FIG. 2 is a cross-sectional view taken along line I-I' illustrated in FIG. 1.

FIG. 1 is a perspective view illustrating a display device 10 according to an embodiment of the present disclosure, and FIG. 2 is a cross-sectional view taken along line I-I' illustrated in FIG. 1. All the components of the display device according to all embodiments of the present disclosure are operatively coupled and configured.

Referring to FIGS. 1 and 2, the display device 10 according to an embodiment of the present disclosure may include an image display module 100 and first to fourth edge display modules 200a, 200b, 200c, and 200d.

The image display module 100 may include a display area (or an active area) AA, which displays an image, and a non-display area (or an inactive area) IA that surrounds the display area AA. Here, the non-display area IA may include first and second non-display areas, which are parallel to a first lengthwise direction X of the image display module 100, and third and fourth non-display areas which are parallel to a second lengthwise direction Y intersecting the first lengthwise direction X. For example, the first non-display area may be defined as a lower edge area of the image display module 100, the second non-display area may be defined as an upper edge area of the image display module 100, the third non-display area may be defined as a left edge area of the image display module 100, and the fourth non-display area may be defined as a right edge area of the image display module 100.

The image display module 100 according to an embodiment may include an image display panel 110 that includes the display area AA and the non-display area IA surrounding the display area AA.

The image display panel 110 according to an embodiment may include a lower substrate 111, an upper substrate 113, a lower polarization member 115, and an upper polarization member 117.

The lower substrate 111 may include a plurality of pixels respectively provided in a plurality of pixel areas defined by a panel signal line including a plurality of gate lines and a plurality of data lines. Each of the pixels may include a thin film transistor (TFT) connected to a gate line and a data line, a pixel electrode connected to the TFT, and a common electrode which is provided adjacent to the pixel electrode and is supplied with a common voltage.

The lower substrate 111 may include a pad part PP provided in the first or second non-display area. The pad part PP may include a plurality of pad electrodes which are respectively connected to the plurality of data lines provided in the display area AA in a one-to-one relationship.

The lower substrate 111 may include an embedded gate driving circuit unit that is provided in the third non-display area and/or the fourth non-display and is connected to the plurality of gate lines provided in the display area AA to drive the plurality of gate lines in a progressive driving manner or an interlacing manner. The embedded gate driving circuit unit may be a shift register that supplies a gate pulse to the gate lines, and the shift register may be manufactured so as to be connected to each of the gate lines in a process of manufacturing a thin film transistor (TFT) of each of the pixels. The embedded gate driving circuit unit may supply the gate pulse having a gate-on voltage during a scan period for each of the gate lines, and during the other maintenance period, may supply a gate-off voltage.

The upper substrate 113 may include a pixel defining pattern, which defines an opening area overlapping each of the plurality of pixel areas provided on the lower substrate 111, and a color filter that is provided in the opening area. The upper substrate 113 may be facing-bonded to the lower substrate 111 by a sealant with a liquid crystal layer therebetween and may cover a portion of the lower substrate 111 other than the pad part PP.

The lower polarization member 115 may be attached on a rear surface of the lower substrate 111 and may polarize light, which is incident from a backlight unit, to a first polarization axis and may irradiate the polarized light onto the lower substrate 111.

The upper polarization member 117 may be attached on a front surface of the upper substrate 113 and may polarize light which passes through the upper substrate 113 and is output to the outside. The upper polarization member 117 according to an embodiment may include a polarization film that is attached on the front surface of the upper substrate 113 and polarizes color light, which passes through the upper substrate 113 and is output to the outside, to a second polarization axis different from the first polarization axis. According to another embodiment, the upper polarization member 117 may include a retarder film that is attached on the polarization film (i.e., an upper surface of the polarization film) and includes a left-eye retarder pattern and a right-eye retarder pattern for separating a three-dimensional (3D) image (i.e., a left-eye image and a right-eye image), displayed on the image display panel 110, into different polarization states.

The image display module 100 according to the present embodiment may further include a panel supporting frame 120, a rear cover 140, and a backlight unit 160.

The panel supporting frame 120 may support the image display panel 110. The panel supporting frame 120 according to an embodiment may include a frame body 121, a panel supporting side wall 123 which is provided vertical to an upper surface of the frame body 121 and is coupled to a rear edge of the image display panel 110, a groove 125 that is provided in an outer surface of the frame body 121, an inclined portion 127 that is provided on an inner surface of the frame body 121, and a cover inserting groove 129 that is provided concavely from a lower surface of the frame body 121.

The frame body 121 may be formed of a metal material or a plastic material, but may be formed of a metal material such as aluminum (Al), for maintaining a rigidity of the display device.

The panel supporting side wall 123 may be coupled to the rear edge of the image display panel 110 by using a panel adhesive member 130.

The groove 125 may be concavely provided to have a certain depth from an outer surface of the frame body 121 overlapping the pad part PP of the image display panel 110.

The inclined portion 127 may be inclined from an inner top, which is adjacent to a bottom of the image display panel 110, to an inner bottom of the frame body 121 and may transfer light, which is incident from the backlight unit 160, toward the image display panel 110.

The cover inserting groove 129 may be concavely provided to have a certain length from a bottom of the frame body 121. A side wall of the rear cover 140 may be inserted into the cover inserting groove 129.

Optionally, the panel supporting frame 120 according to and embodiment may include first to fourth frame members which are coupled to one another to have a tetragonal band shape.

The first frame member may be disposed in parallel with a first horizontal axis direction X. The second frame member may be disposed in parallel with the first frame member. The third frame member may be disposed in parallel with a second horizontal axis direction Y horizontally intersecting the first horizontal axis direction X on the same plane and may be coupled to one end of the first frame member and one end of the second frame member in a diagonal coupling manner. The fourth frame member may be disposed in parallel with the third frame member and may be coupled to the other end of the first frame member and the other end of the second frame member in the diagonal coupling manner.

The first to fourth frame members according to an embodiment may each include the frame body 121, the panel supporting side wall 123, the groove 125, the inclined portion 127, and the cover inserting groove 129 described above. Such elements are as described above, and thus, their repetitive descriptions are omitted.

In addition, the display device 10 according to the present embodiment may further include a plurality of module connecting parts 170 which are installed in the frame body 121 of the panel supporting frame 120 (or the first to fourth frame members).

The plurality of module connecting parts 170 may be installed in the frame body 121 and may be arranged at certain intervals. Each of the module connecting parts 170 according to an embodiment may be coupled to the frame body 121 by coupling a screw thread, provided in one end thereof, to a screw hole provided in the frame body 121. The plurality of module connecting parts 170 according to an embodiment may each include a connection groove 171 having a certain depth.

The rear cover 140 may cover a rear surface of the panel supporting frame 120 and may support a portion of the backlight unit. The rear cover 140 according to an embodiment may include a cover plate 141 and a cover side wall 143.

The cover plate 141 may have a plate shape that covers the rear surface of the panel supporting frame 120.

The cover side wall 143 may be vertically connected to an edge end of the cover plate 141 and may be inserted into the cover inserting groove 129 of the panel supporting frame 120.

The backlight unit 160 may be disposed in the rear cover 140 and the panel supporting frame 120 to irradiate light onto the image display panel 110. The backlight unit 160 according to an embodiment may include a reflective sheet 161, a plurality of light source modules 162, a diffusive plate 163, and an optical sheet part 164.

The reflective sheet 161 may be disposed to cover the cover plate 141 of the rear cover 140 and the inclined portion 127 of the panel supporting frame 120. In this case, an edge of the reflective sheet 161 may be supported to a top of the frame body 121 of the panel supporting frame 120. The reflective sheet 161 may reflect light, traveling toward the rear cover 140 and the panel supporting frame 120, to the diffusive plate 163, thereby minimizing the loss of the light.

The plurality of light source modules 162 may be arranged at certain intervals on the cover plate 141 of the rear cover 140 to irradiate light onto the diffusive sheet 163. Each of the light source modules 162 according to an embodiment may include a light source printed circuit board (PCB) 162a which is supported to the cover plate 141, a plurality of light emitting diode (LED) packages which are mounted on the light source PCB 162a and are arranged at certain intervals, and a plurality of optical lenses 162c which are coupled to the light source PCB 162a to cover the respective LED packages 162b.

The diffusive plate 163 may be disposed in the panel supporting frame 120 to cover the plurality of light source modules 162. The diffusive plate 163 may diffuse light, which is incident from each of the plurality of light source modules 162, to a whole area (i.e., entire area) of the bottom of the image display panel 110.

The optical sheet part 164 may be disposed on the diffusive plate 163 to enhance a luminance characteristic of light incident from the diffusive plate 163. For example, the optical sheet part 164 may include a diffusive sheet, a prism sheet, and a dual brightness enhancement film, but is not limited thereto. In other embodiments, the optical sheet part 164 may be configured by a stacked combination of two or more elements selected from among the diffusive sheet, the prism sheet, the dual brightness enhancement film, and a lenticular sheet.

Each of the first to fourth edge display modules 200a, 200b, 200c, and 200d may display an image on a bezel area BA of the image display module 100 (or the image display panel 110) overlapping each of the first to fourth non-display areas IA defined in the image display panel 110 to conceal the bezel area BA, and moreover, may act as a case that covers a front edge and each side surface of the image display module 100 (or the image display panel 110). Here, if the image displayed on the bezel area BA is defined as a bezel image, the bezel image and a panel image displayed on the display area AA of the image display module 100 may be disposed as one image on a whole front surface of the display device without being physically separated from each other. Each of the first to fourth edge display modules 200a, 200b, 200c, and 200d may conceal the bezel area BA of the image display module 100 (or the image display panel 110) by using the bezel image, and thus, may be defined as a bezel concealing module.

Each of the first to fourth edge display modules 200a, 200b, 200c, and 200d according to an embodiment may include a plurality of bezel pixels that display the bezel image in a driving manner different from a driving manner of a pixel (hereinafter referred to as a panel pixel) provided in the image display panel 110. For example, the panel pixel may be a non-self-emitting pixel, and the bezel pixel may be a self-emitting pixel. As another example, the panel pixel may display an image according to a voltage driving manner, and the bezel pixel may display an image according to a current driving manner. As another example, the panel pixel may display an image according to an active matrix display manner, and the bezel pixel may display an image according to a passive matrix display manner.

The first edge display module 200a may be disposed to cover the first non-display area of the image display panel 110. The second edge display module 200b may be disposed to cover the second non-display area of the image display panel 110. The third edge display module 200c may be disposed to cover the third non-display area of the image display panel 110. The fourth edge display module 200d may be disposed to cover the fourth non-display area of the image display panel 110.

Each of the first to fourth edge display modules 200a, 200b, 200c, and 200d may display the bezel image on the bezel area BA of the image display module 100 according to driving of a dot light source array 230 including a plurality of dot light source devices 231. Here, each of the plurality of dot light source devices 231 may be an LED package, a micro LED chip, or an LED configured with a chip-scale package.

Each of the first to fourth edge display modules 200a, 200b, 200c, and 200d may display the bezel image on the bezel area BA of the display device by using the plurality of dot light source devices 231 to remove a dark portion which occurs in the bezel area BA when driving the image display module 100, thereby zeroising the bezel of the display device. Also, in the input image, a peripheral image of the panel image displayed on the display area AA and a non-display image (or a cut image) which is not displayed on the display area AA may be displayed as the bezel image according to a resolution of the image display panel 110, thereby increasing a resolution of the display device and a size of an image.

The display device 10 according to the present embodiment may further include a panel driving circuit 300 and a control board 500.

The panel driving circuit 300 may be connected to the pad part PP provided on the lower substrate 111 of the image display panel 110. The panel driving circuit 300 may display an image, corresponding to panel pixel data supplied from the control board 500, on the display area AA of the image display panel 110. The panel driving circuit 300 according to an embodiment may include a plurality of flexible circuit films 310, a plurality of data driving integrated circuits (ICs) 330, and a PCB 350.

Each of the plurality of flexible circuit films 310 may be attached on the pad part PP of the lower substrate 111 and the PCB 350 in a film attaching process. Each of the plurality of flexible circuit films 310 may receive a signal transferred from the PCB 350 to transfer the received signal to a corresponding data driving IC of the plurality of data driving ICs 330 and the embedded gate driving circuit unit and may transfer a data voltage, output from a corresponding data driving IC of the plurality of data driving ICs 330, to the pad part PP. Each of the plurality of flexible circuit films 310 according to an embodiment may be bent from the pad part PP along a side surface of the lower substrate 111 and may be disposed in the groove 125 provided in the panel supporting frame 120.

The plurality of data driving ICs 330 may be respectively mounted on the plurality of flexible circuit films 310 in a one-to-one relationship. Each of the plurality of data driving ICs 330 may receive the panel pixel data and a data control signal supplied from the control board 500, convert the panel pixel data into a pixel-based analog data voltage according to the data control signal, and supply the analog data voltage to a corresponding data line provided on the lower substrate 111.

The PCB 350 may be connected between the plurality of flexible circuit films 310 and the control board 500. The PCB 350 may be connected to the control board 500 through a first signal cable. The PCB 350 may transfer the panel pixel data, the data control signal, a gate control signal, and a driving power, which are supplied from the control board 500, to the plurality of data driving ICs 330 and the embedded gate driving circuit unit. The PCB 350 according to an embodiment may be accommodated into the groove 125 provided in the panel supporting frame 120.

The control board 500 may extract edge pixel data, corresponding to the bezel area BA overlapping the non-display area IA of the image display panel 110, from an input image signal supplied from an external host driving system or an integrated control board and may supply the edge pixel data to each of the first to fourth edge display modules 200a, 200b, 200c, and 200d, thereby concealing the bezel area BA. That is, the control board 500 may include a data processing circuit 510 that generates the panel pixel data and the edge pixel data, based on the input image signal and a timing sync signal supplied from the external host driving system or the integrated control board. Here, the control board 500 may be connected to the PCB 350 of the panel driving circuit 300 through the first signal cable and may be connected to the first to fourth edge display modules 200a, 200b, 200c, and 200d through a plurality of second signal cables 400.

The data processing circuit 510 may receive the input image signal and the timing sync signal supplied from the external host driving system or the integrated control board. The data processing circuit 510 may generate the panel pixel data and the edge pixel data, based on the received input image signal, supply the panel pixel data to the panel driving circuit 300, and supply the edge pixel data to a corresponding edge display module of the first to fourth edge display modules 200a, 200b, 200c, and 200d.

The data processing circuit 510 may generate the data control signal and the gate control signal, based on the received timing sync signal, control a driving timing of each of the plurality of data driving ICs 330 by using the data control signal, and control a driving timing of the embedded gate driving circuit unit by using the gate control signal.

Figure 3:
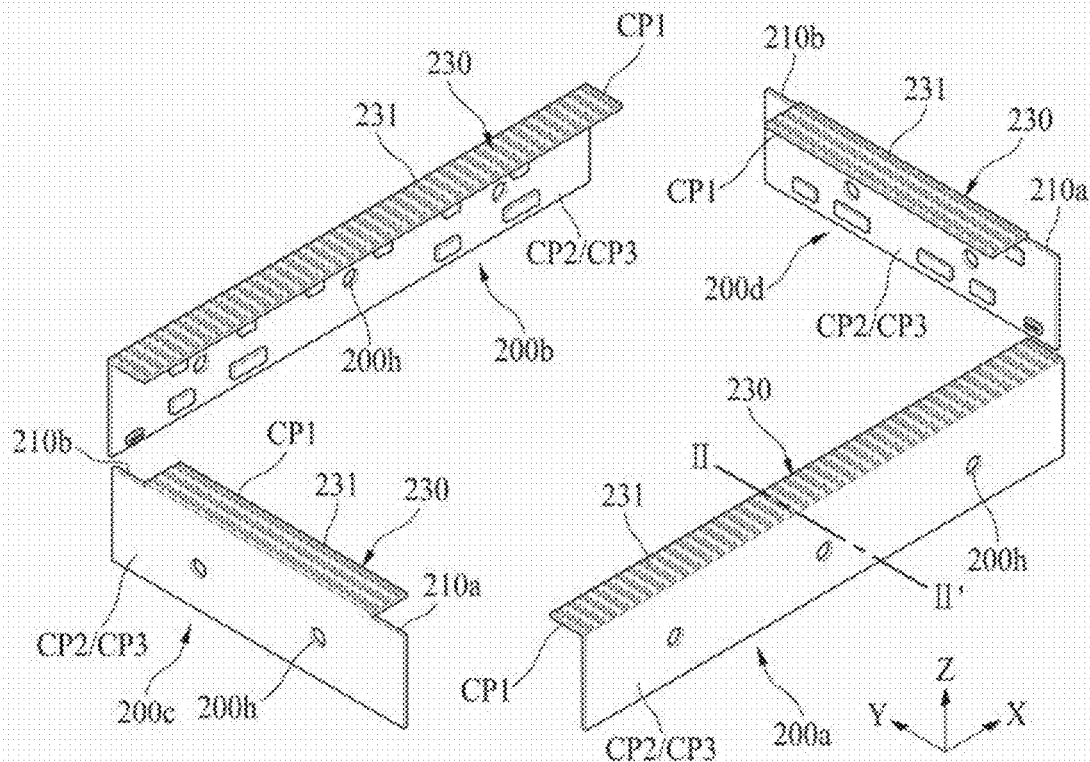
FIG. 3 is an exploded perspective view for describing first to fourth edge display modules illustrated in FIG. 1.
Figure 4:
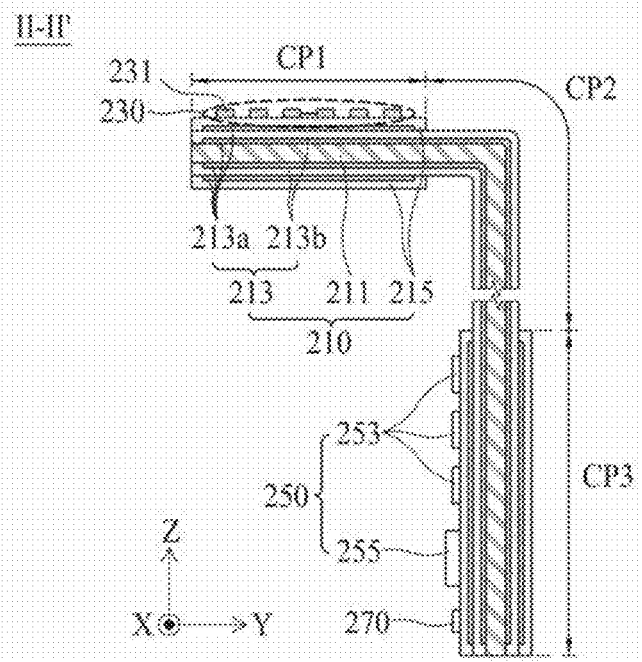
FIG. 4 is a cross-sectional view taken along line II-II' illustrated in FIG. 3.
Figure 5:
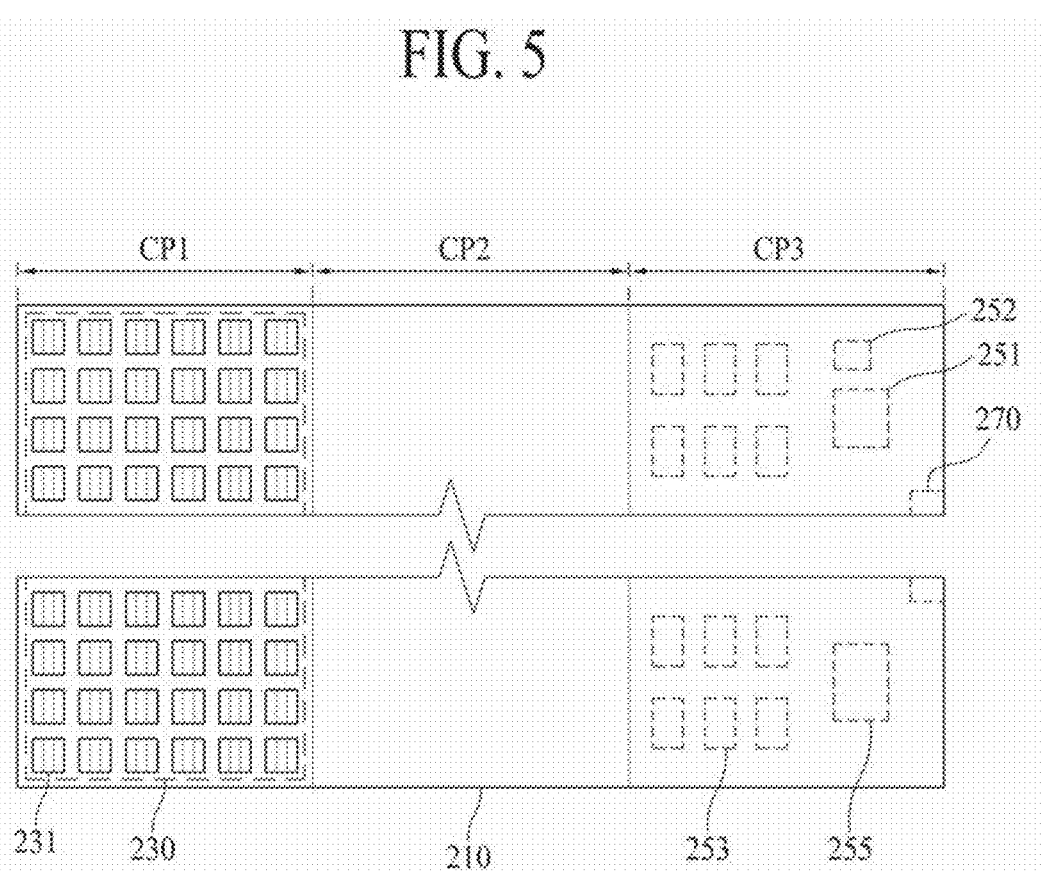
FIG. 5 is a plan view of each of the first to fourth edge display modules illustrated in FIG. 3.
Figure 6:
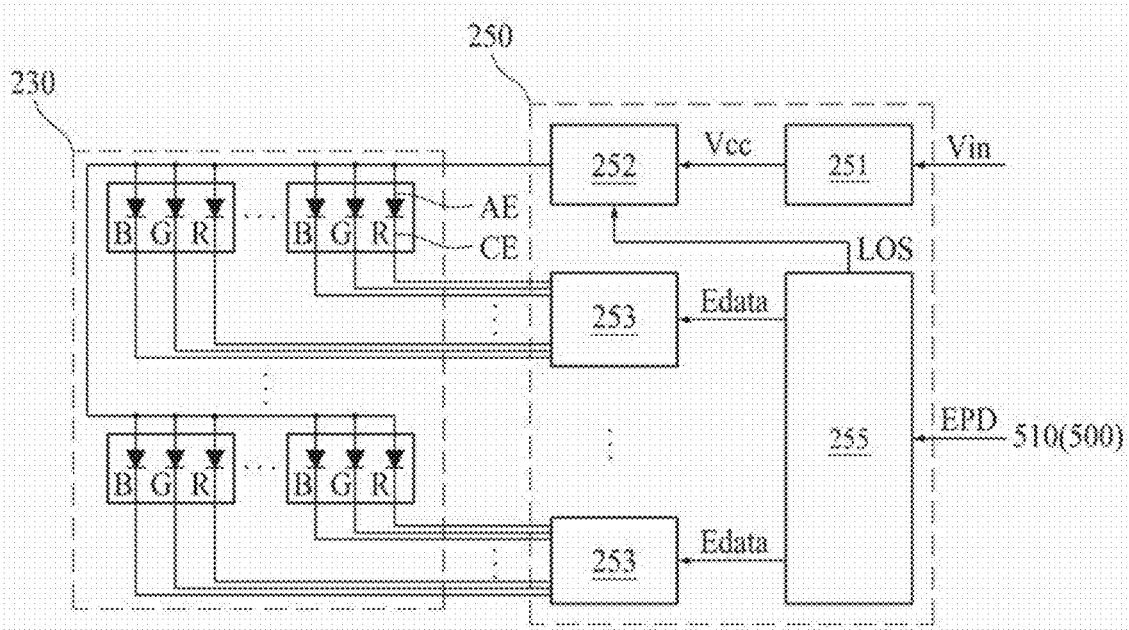
FIG. 6 is a circuit diagram illustrating an edge display module illustrated in FIG. 5.

FIG. 3 is an exploded perspective view for describing the first to fourth edge display modules illustrated in FIG. 1, FIG. 4 is a cross-sectional view taken along line II-II' illustrated in FIG. 3, FIG. 5 is a plan view of each of the first to fourth edge display modules illustrated in FIG. 3, and FIG. 6 is a circuit diagram illustrating an edge display module illustrated in FIG. 5.

Referring to FIGS. 3 to 6, each of the first to fourth edge display modules 200a, 200b, 200c, and 200d according to the present embodiment may surround the image display module 100 (in more detail, the non-display area IA and a side surface of the image display panel 110) and may display an image on the bezel area BA of the image display panel 110, thereby increasing a resolution of the image displayed on the bezel area BA of the display device.

Each of the first to fourth edge display modules 200a, 200b, 200c, and 200d according to an embodiment may include a flexible PCB (FPCB) 210, a dot light source array 230, a light source driving circuit unit 250, and a connector 270.

The FPCB 210 may surround the non-display area IA and a side surface of the image display module 100. That is, the FPCB 210 may cover the non-display area IA of the image display panel 110 and may cover the side surface of the image display module 100.

The FPCB 210 may include a fire cover part CP1 which covers the non-display area IA of the image display module 100, a second cover part CP2 that is bent from the first cover part CP1 and is disposed on the side surface of the image display module 100, and a third cover part CP3 that extends from the second cover part CP2.

The first cover part CP1 may be disposed to cover the non-display area IA of the image display panel 110 and to overlap a front edge of the image display panel 110. Accordingly, the first cover part CP1 may act as a front cover that covers a front edge of the display device. The first cover part CP1 may have a flexible or rigid characteristic.

The second cover part CP2 may be bent from the first cover part CP1 and may cover the side surface of the image display panel 110 and a side surface of the panel supporting frame 120. Therefore, the second cover part CP2 may act as a side cover that covers the side surface of the image display module 100. The second cover part CP2 may be provided between the first cover part CP1 and the third cover part CP3 and may have a thickness which is relatively thinner than that of each of the first cover part CP1 and the third cover part CP3. Accordingly, the second cover part CP2 may have a flexible characteristic which enables the second cover part CP2 to be bent from the first cover part CP1 to the side surface of the image display module 100. In addition, the second cover part CP2 may include a plurality of through holes 200h that respectively face the plurality of module connecting parts 170 installed in the panel supporting frame 120. The plurality of through holes 200h may respectively expose the plurality of module connecting parts 170 to the outside.

The second cover part CP2 of each of the third and fourth edge display modules 200c and 200d may include a first wing part 210a and a second wing part 210b.

The first wing part 210a may extend from one side surface of the second cover part CP2 along the second lengthwise direction Y of the image display panel 110 and may extend by a length corresponding to a width of the first cover part CP1 of the first edge display module 200a. An outer surface and an upper surface of the first wing part 210a, as illustrated in FIG. 1, may be covered by the first cover part CP1 of the first edge display module 200a.

The second wing part 210b may extend from the other side surface of the second cover part CP2 along the second lengthwise direction Y of the image display panel 110 and may extend by a length corresponding to a width of the first cover part CP1 of the second edge display module 200b. An outer surface and an upper surface of the second wing part 210b, as illustrated in FIG. 1, may be covered by the first cover part CP1 of the second edge display module 200b.

The first cover part CP1 of each of the third and fourth edge display modules 200c and 200d may be inserted into and disposed in a space between the first cover parts CP1 of the first and second edge display modules 200a and 200b. Therefore, the first cover parts CP1 of the first to fourth edge display modules 200a, 200b, 200c, and 200d may be disposed on the same plane to have a tetragonal band shape and may cover the non-display area IA (i.e., the bezel area) of the image display panel 110.

The third cover part CP3 may long extend from the second cover part CP2 and may be disposed on the side surface of the image display module 100 or may be disposed in a rear edge of the image display module 100. Therefore, the third cover part CP3 may have a flexible or rigid characteristic. Here, if the third cover part CP3 is disposed on the side surface of the image display module 100, the display device is slimmed, and a length of FPCB 210 is shortened, thereby decreasing the cost of the FPCB 210. Also, if the third cover part CP3 is disposed on a rear surface of the image display module 100, the FPCB 210 is easily connected to the control board 500.

The FPCB 210 according to an embodiment may include a base film 211, a driving line layer 213, and a passivation layer 215.

The base film (or a base core) 211 may include a flexible material, for example, a polyimide material. The base film 211 may include the first to third cover parts CP1 to CP3 corresponding to a position installed in the image display module 100.

The driving line layer 213 may be provided on the base film 211 in a single-layer structure or a multi-layer structure and may be connected to the plurality of dot light source devices 231 and the light source driving circuit unit 250. The driving line layer 213 according to an embodiment may be provided on at least one of a first surface and a second surface, which is opposite to the first surface, of the base film 211 to have an at least one-layer structure including a line layer 213a and an insulation layer 213b.

The line layer 213a according to an embodiment may include one of conductive materials, such as copper (Cu), gold (Au), silver (Ag), aluminum (Al), nickel (Ni), and tin (Sn), or an alloy thereof. The line layer 213a may be directly provided on the base film 211, or may be manufactured in a sheet form and may be attached on the base film 211 by an adhesive member.

The insulation layer 213b according to an embodiment may include an insulating material such as polyimide. The insulation layer 213b may be directly provided on the base film 211, or may be manufactured in a sheet form and may be attached on the base film 211 by an adhesive member.

The passivation layer 215 may protect the driving line layer 213 provided on the base film 211.

The passivation layer 215 according to an embodiment may be formed of a soft material and may be provided all over the first surface and the second surface of the base film 211 to cover the driving line layer 213. The passivation layer 215 may be formed of an insulating material such as polyimide. In this case, the FPCB 210 may be wholly bent.

The passivation layer 215 according to an embodiment may be formed of a hard material and may be provided to cover the driving line layer 213 provided in the first cover part CP1 of the base film 211. For example, the passivation layer 215 may be a photo solder resist (PSR). In this case, the FPCB 210 may include a rigid area, corresponding to the first cover part CP1 where the passivation layer 215 is provided, and a flexible area corresponding to the second and third cover parts CP2 and CP3 where the passivation layer 215 is not provided. In this case, the passivation layer 215 increases a rigidity of the first cover part CP1 to maintain the first cover part CP1 in a planar state, thereby preventing the first cover part CP1 from being bent, maintaining the first cover part CP1 in a planar state, and enabling the second cover part CP2 to be bent.

The passivation layer 215 according to an embodiment may be formed of a hard material and may be provided to cover the driving line layer 213 provided in each of the first and third cover parts CP1 and CP3 of the base film 211. That is, the passivation layer 215 may cover the driving line layer 213 provided on the first and second surfaces of the base film 211 other than the second cover part CP2 of the base film 211 where the driving line layer 213 is provided. For example, the passivation layer 215 may be a photo solder resist (PSR). In this case, the FPCB 210 may include a rigid area, corresponding to the first and third cover parts CP1 and CP3 where the passivation layer 215 is provided, and a flexible area corresponding to the second cover part CP2 where the passivation layer 215 is not provided. In this case, the passivation layer 215 prevents the first and third cover parts CP1 and CP3 from being bent, thereby maintaining the first and third cover parts CP1 and CP3 in a planar state and enabling the second cover part CP2 to be bent.

The dot light source array 230 may be provided in the first cover part CP1 of the FPCB 210 to display an image on the bezel area BA. The dot light source array 230 according to an embodiment may include the plurality of dot light source devices 231.

The plurality of dot light source devices 231 may be mounted on the first cover part CP1 defined in the FPCB 210 and may be electrically connected to the light source driving circuit unit 250 through the driving line layer 213 of the FPCB 210 to display the bezel image according to driving of the light source driving circuit unit 250.

Each of the dot light source devices 231 according to an embodiment may be mounted on a front surface of the first cover part CP1 defined in the FPCB 210 so as to be driven according to the passive matrix display manner. For example, each of the dot light source devices 231 may be an LED package, a micro LED chip, or a chip-scale package, or may be an LED package including one thereof. Each of the dot light source devices 231 may be mounted on the first cover part CP1 defined in the FPCB 210 through a bonding process using surface mount technology.

The plurality of dot light source devices 231 according to an embodiment may be arranged in the first cover part CP1 along the first lengthwise direction X and the second lengthwise direction Y of the image display panel 110, and in this case, may be arranged at intervals which are the same as an interval at which the pixels provided in the display area AA of the image display panel 110 are arranged. That is, the plurality of dot light source devices 231 may be disposed on the same line without a mismatch with the pixels in each of a row direction and a column direction, for preventing a sense of discontinuity of an image which occurs between the bezel image displayed by the dot light source array 230 and an image displayed on the display area AA of the image display panel 110.

Each of the plurality of dot light source devices 231 may be defined as a bezel pixel for displaying the bezel image. At least three adjacent dot light source devices of the plurality of dot light source devices 231 may be grouped into one unit bezel pixel. The one unit bezel pixel may include a red dot light source R, a green dot light source G, and a blue dot light source B. Here, one dot light source may have a size which is equal to or less than that of one pixel provided in the display area AA of the image display panel 110, thereby displaying the bezel image having the same resolution as that of the image display panel 110.

Each of the plurality of dot light source devices 231 may include an anode electrode, a cathode electrode, and a light emitting layer provided therebetween. For example, the anode electrodes of the dot light source devices 231 may be connected to a first power line provided in the driving line layer 213 of the FPCB 210 in common, and the cathode electrodes of the dot light source devices 231 may be respectively connected to a plurality of second power lines provided in the driving line layer 213 of the FPCB 210 in a one-to-one relationship. Each of the dot light source devices 231 may emit light with a current which flows based on a voltage supplied through the first power line and a voltage supplied to the cathode electrode through a corresponding second power line of the plurality of second power lines, thereby displaying the bezel image on the first cover part CP1 of the FPCB 210.

The light source driving circuit unit 250 may be provided on the third cover part CP3 of the FPCB 210 and may allow each of the dot light source devices 231 to emit, thereby displaying the bezel image on the dot light source array 230 to conceal the bezel image displayed on the image display module 100. The light source driving circuit unit 250 according to an embodiment may include a light source power generator 251, a plurality of light source driving ICs 253, and an emission data processor 255.

The light source power generator 251 may be mounted on the third cover part CP3 of the FPCB 210 and may be electrically connected to the connector 270 and each of the dot light source devices 231. The light source power generator 251 may generate a light source driving voltage Vcc, based on an input power Vin supplied through the connector 270 and a power input line of the driving line layer 213 from the outside and may supply the light source driving voltage Vcc to each of the dot light source devices 231. The light source driving voltage Vcc may be supplied to the anode electrodes of the dot light source devices 231 through the first power line of the driving line layer 213 in common. The light source power generator 251 according to an embodiment may be a DC/DC converter based on a voltage boosting manner or a voltage dropping manner or an AC/DC converter based on a voltage boosting manner or a voltage dropping manner.

The plurality of light source driving ICs 253 may be mounted on the third cover part CP3 of the FPCB 210 and may be electrically connected to the emission data processor 255 and the plurality of dot light source devices 231, respectively. Each of the light source driving ICs 253 may control a current flowing in a corresponding dot light source device of the dot light source devices 231, based on light source-based emission data Edata supplied from the emission data processor 255 through a corresponding data transmission line of a plurality of data transmission lines provided in the driving line layer 213. For example, each of the light source driving ICs 253 may generate a light source-based data voltage, based on the light source-based emission data Edata and may supply the generated light source-based data voltage to the cathode electrode of a corresponding dot light source device of the dot light source devices 231. The light source-based data voltage may be individually supplied to the cathode electrode of a corresponding dot light source device of the dot light source devices 231 through a corresponding second power line of the plurality of second power lines of the driving line layer 213.

Each of the plurality of light source driving ICs 253 according to an embodiment may simultaneously drive thirty dot light source devices 231, but may simultaneously drive thirty or less or more dot light source devices 231 without being limited thereto. Therefore, the number of the light source driving ICs 253 mounted on the third cover part CP3 of the FPCB 210 may be set based on the number of the dot light source devices 231 mounted on the first cover part CP1 of the FPCB 210 or a resolution of the dot light source array 230.

The emission data processor 255 may be mounted on the third cover part CP3 of the FPCB 210 and may be connected to the connector 270 and the plurality of light source driving ICs 253. The emission data processor 255 may receive a chip selection signal and edge pixel data EPD supplied through the connector 270 and a plurality of data input lines of the driving line layer 213 from the data processing circuit 510 of the control board 500, remove noise from the received edge pixel data EPD to generate the light source-based emission data Edata, and supply the light source-based emission data Edata to the light source driving IC 253 corresponding to the chip selection signal. The light source-based emission data Edata may be supplied to a corresponding light source driving IC 253 through a chip-based emission data input line of the driving line layer 213.

Optionally, the light source driving circuit unit 250 according to an embodiment may further include a light source on/off device 252. The light source on/off device 252 may be turned on according to a light source on/off signal LOS supplied from the emission data processor 255 to selectively cut off the light source driving voltage Vcc supplied from the light source power generator 251 to the dot light source array 230. The light source on/off device 252 according to an embodiment may be a power transistor that includes a gate terminal supplied with the light source on/off signal LOS, a drain terminal connected to a power output terminal of the light source power generator 251, and a source terminal connected to a first power line of the driving line layer 231. Here, the drain terminal and the source terminal of the power transistor may switch therebetween, based on a direction in which a current flows.

The connector 270 may be mounted on the third cover part CP3 of the FPCB 210 and may be connected to the light source power generator 251 and the emission data processor 255. Also, the connector 270 may be connected to the control board 500 through a plurality of second signal cables 400. The connector 270 may transfer the edge pixel data EPD, supplied from the data processing circuit 510 of the control board 500, to the emission data processor 255 and may transfer the input power Vin, supplied from the outside, to the light source power generator 251.

Each of the first to fourth edge display modules 200a, 200b, 200c, and 200d according to the present embodiment may include the FPCB 210 with the dot light source array 230 and the light source driving circuit unit 250 mounted thereon, the display device is slimmed, and a driving circuit configuration of the display device is simplified.

Figure 7:
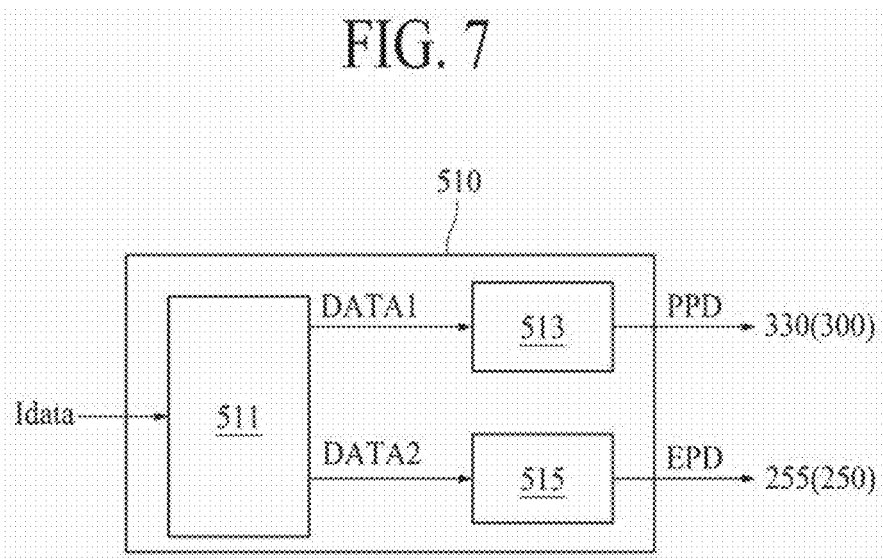
FIG. 7 is a diagram for describing a data processing circuit of a control board illustrated in FIG. 2.

FIG. 7 is a diagram for describing the data processing circuit of the control board illustrated in FIG. 2.

Referring to FIGS. 2 and 7, the data processing circuit 510 of the control board 500 according to the present embodiment may include a data extractor 511, a timing controller 513, and an edge data generator 515.

The data extractor 511 may receive the timing sync signal and the input image signal Idata supplied from the external host driving system or the integrated control board and may extract panel image data DATA1, having a resolution which is set in the display area AA of the image display panel 110, and edge image data DATA2, having a resolution which is set in the bezel area BA, from the received input image signal Idata.

The timing controller 513 may align the panel pixel data DATA1 supplied from the data extractor 511 according to a pixel arrangement structure of the image display panel 110 to generate panel pixel data PPD and may supply the generated panel pixel data PPD to the plurality of data driving ICs 330 included in the panel driving circuit 300. Also, the timing controller 513 may generate the data control signal and the gate control signal, based on the timing sync signal and may control driving of the plurality of data driving ICs 330 and the embedded gate driving circuit by using the data control signal and the gate control signal.

The edge data generator 515 may align the edge image data DATA2 supplied from the data extractor 511 according to an arrangement structure of the bezel pixels provided in each of the first to fourth edge display modules 200a, 200b, 200c, and 200d to generate the edge pixel data EPD and may the generated edge pixel data EPD to the emission data processor 255 of the light source driving circuit unit 250 provided in each of the first to fourth edge display modules 200a, 200b, 200c, and 200d. That is, the edge data generator 250 may align the edge image data DATA2 according to a pixel arrangement structure of each of the first to fourth edge display modules 200a, 200b, 200c, and 200d to generate module-based edge pixel data EPD and may supply the generated module-based edge pixel data EPD to the emission data processor 255 of the light source driving circuit unit 250 corresponding thereto.

Since the display device 10 according to the present embodiment displays the bezel image on the bezel area BA overlapping the non-display area IA of the image display module 100 by using the plurality of dot light source devices 231, the bezel area BA may be concealed when the image display module 100 is driven, and thus, a dark portion occurring in the bezel area BA is removed, thereby realizing a zero bezel.

Figure 8:
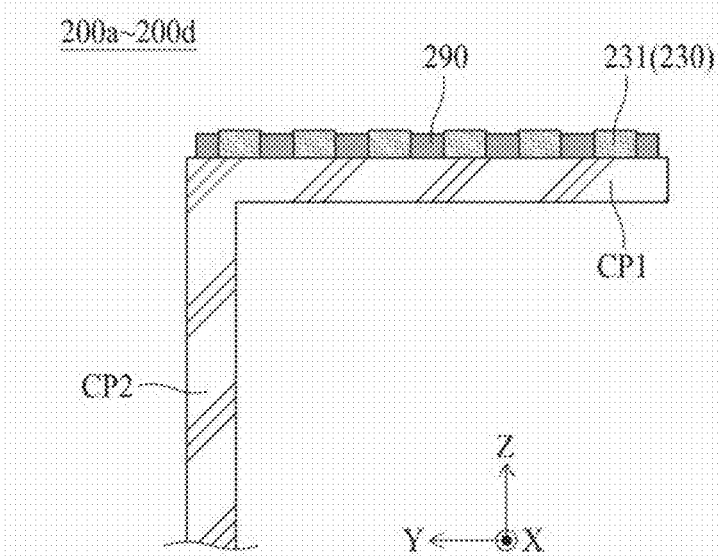
FIG. 8 is a diagram for describing an additional element of an edge display module according to an embodiment of the present disclosure.

FIG. 8 is a diagram for describing an additional element of an edge display module according to an embodiment of the present disclosure.

Referring to FIG. 8, each of the first to fourth edge display modules 200a, 200b, 200c, and 200d according to the present embodiment may further include a light guider 290.

The light guider 290 may be provided in the first cover part CP1 to surround a side surface of each of the plurality of dot light source devices 231. That is, the light guider 290 may be provided in plurality, and the plurality of light guider 290 may each be provided between two adjacent dot light source devices of the plurality of dot light source devices 231 to cover a portion of the first cover part CP1 except each of the dot light source devices 231. In this case, the light guider 290 may have a height which is lower in position than each of the dot light source device 231. That is, the light guider 290 may be provided to surround the side surface of each of the dot light source devices 231 without protruding to a portion on a light output surface of the each of the dot light source devices 231. The light guider 290 according to an embodiment may include a light absorbing material, and for example, may include black matrix or black silicon. The light guider 290 may be provided by a dispensing process.

The light guider 290 may spatially separate adjacent dot light source devices 231 to increase a linearity of light emitted from each of the dot light source devices 231, thereby increasing an emission efficiency of each of the dot light source devices 231. Also, the light guider 290 prevents light interference or light mixture between adjacent dot light source devices 231 to improve the quality of the bezel image and to increase an adhesive force between each of the dot light source devices 231 and the FPCB, and blocks penetration of water to prevent corrosion of an electrical contact portion between each of the dot light source devices 231 and the FPCB.

Optionally, each of the first to fourth edge display modules 200a, 200b, 200c, and 200d according to the present embodiment may further include an optical member that covers a whole front surface of the dot light source array 230.

The optical member may be attached on the dot light source array 230 by a double-sided tape or an adhesive, and in more detail, may be attached on a whole front surface of each of the dot light source devices 231 and the light guider 290.

The optical member according to an embodiment may be a polarization film having the second polarization axis as that of the upper polarization member of the image display panel. The optical member prevents the plurality of dot light source devices 231 from being damaged by an external impact and polarizes light, emitted from each of the dot light source devices 231, to the second polarization axis to make a polarization axis of the bezel image identical to a polarization axis of an image displayed on the display area.

Figure 9A:
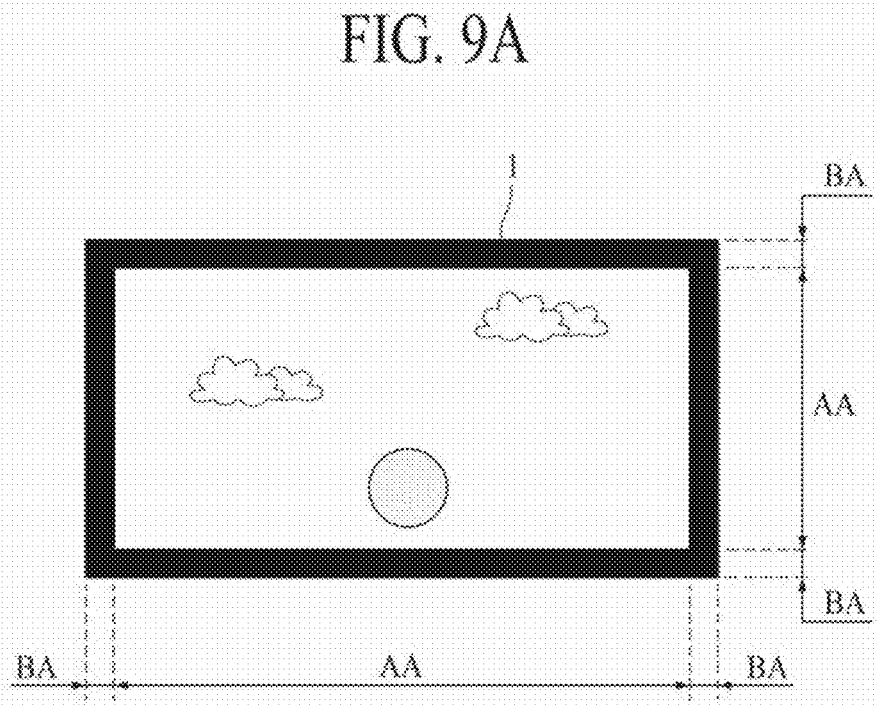
FIGS. 9A and 9B are diagrams illustrating images respectively displayed on a related art display device and a display device according to an embodiment of the present disclosure.
Figure 9B:
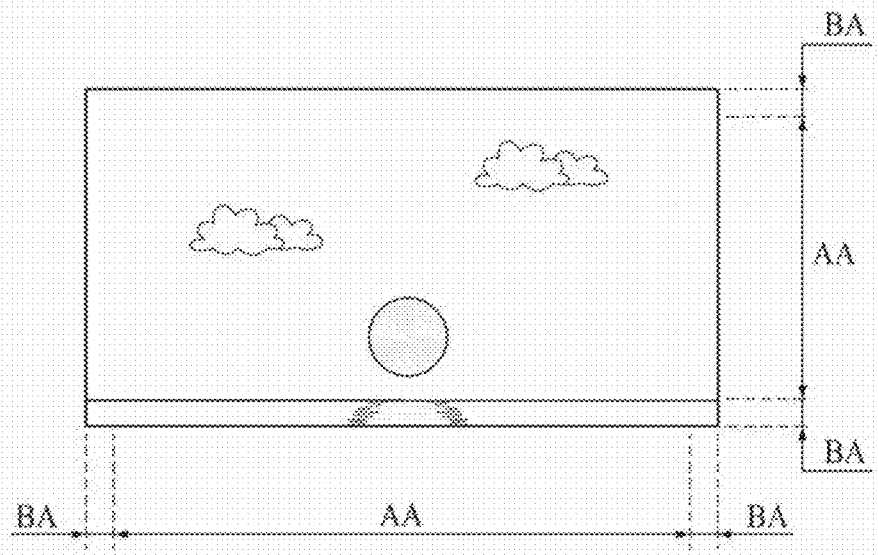

FIGS. 9A and 9B are diagrams illustrating images respectively displayed on a related art display device and a display device according to an embodiment of the present disclosure.

First, as seen in FIG. 9A, in the related art display device, since an image is displayed on only a display area AA of the image display panel, it can be seen that a dark portion occurs in a bezel area BA due to a front case 1 covering a front edge of the image display panel. For example, when a sunrise image on the sea is displayed on the image display panel, the related art display device cannot display to a viewer a sea image (below the sun) included in the sunrise image due to the dark portion in the bezel area BA.

On the other hand, as seen in FIG. 9B, in the display device according to the present embodiment, an image is displayed on a display area AA of the image display panel, and simultaneously, a bezel image is displayed on a bezel area BA through an edge display module, whereby the bezel area BA is concealed when driving the image display panel 100 and thus a dark portion of the bezel area BA is effectively removed. Therefore, it can be seen that a bezel is zeroised or effectively eliminated. For example, unlike the related art, when a sunrise image on the sea is displayed on the image display panel, the display device according to the present embodiment displays a sea image included in the sunrise image through the edge display module overlapping the bezel area BA.

Figure 10:
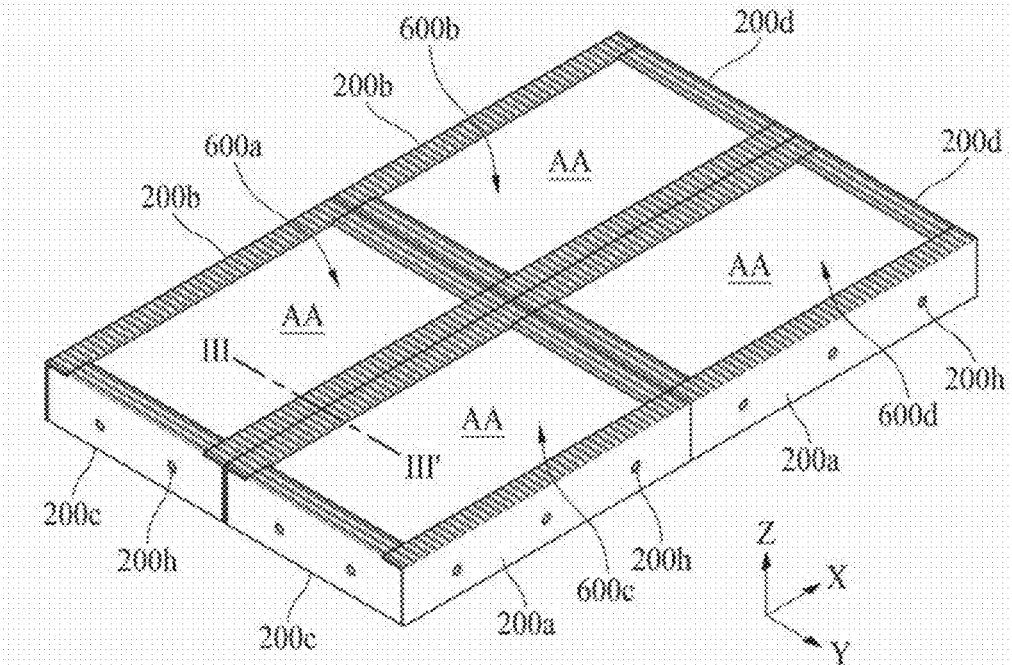
FIG. 10 is a diagram for describing a multiscreen display device according to an embodiment of the present disclosure.
Figure 11:
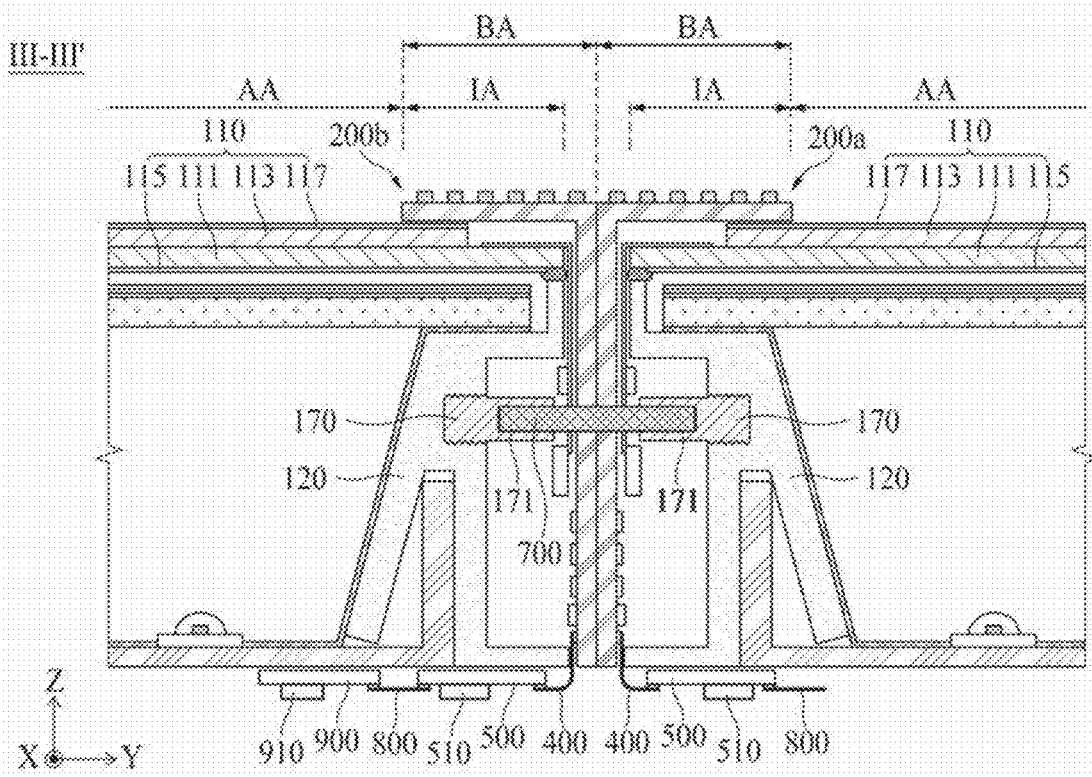
FIG. 11 is a cross-sectional view taken along line illustrated in FIG. 10.

FIG. 10 is a diagram for describing a multiscreen display device according to an embodiment of the present disclosure, and FIG. 11 is a cross-sectional view taken along line III-III' illustrated in FIG. 10.

Referring to FIGS. 10 and 11, the multiscreen display device according to the present embodiment may include a plurality of screen modules 600a, 600b, 600c, and 600d and a plurality of display connecting members 700.

The plurality of screen modules 600a, 600b, 600c, and 600d may be arranged in an N×M form (where N is a positive integer equal to or more than two, and M is a positive integer equal to or more than two) to display individual images or to divide and display one image. The plurality of screen modules 600a, 600b, 600c, and 600d may each include the display device 10 illustrated in FIGS. 1 to 9, and thus, their detailed descriptions are not repeated or may be brief The plurality of display connecting members 700 may respectively connect side surfaces of the plurality of screen modules 600a, 600b, 600c, and 600d. That is, each of the plurality of display connecting members 700 may connect side surfaces of two adjacent screen modules of the plurality of screen modules 600a, 600b, 600c, and 600d arranged in a lattice form, thereby implementing a multiscreen display device.

Each of the display connecting members 700 may be inserted into a connection groove 171 of a module connecting part 170 provided in a panel supporting frame 120 of each of two adjacent display devices of which side surfaces face each other, and thus, may connect the side surfaces of the two adjacent display devices. Each of the display connecting members 700 according to an embodiment may be a supporting bar or a supporting pin inserted into the connection groove 171. One side of each of the display connecting members 700 may pass through a through hole 200h provided in an edge display module 200b of a first display device of two adjacent display devices and may be inserted into a connection groove 171 of a module connecting part 170 provided in a panel supporting frame 120 of the first display device, and the other side of each of the display connecting members 700 may pass through a through hole 200h provided in an edge display module 200a of a second display device of two adjacent display devices and may be inserted into a connection groove 171 of a module connecting part 170 provided in a panel supporting frame 120 of the second display device.

In addition, the multiscreen display device according to the present embodiment may further include an integrated control board 900.

The integrated control board 900 may be connected to a control board 500 of each of the screen modules 600a, 600b, 600c, and 600d through at least one third signal cable 800. The integrated control board 900 may include an image signal generator 910 that receives a raw image signal supplied from an external host driving system and generates a module-based input image signal which is to be displayed on a corresponding screen module of the screen modules 600a, 600b, 600c, and 600d, based on the received raw image signal.

The image signal generator 910 may receive whole resolution information, including a resolution of a display area AA and a resolution of a bezel area BA, from a display device of each of the screen modules 600a, 600b, 600c, and 600d, divide the raw image signal based on the whole resolution information about each display device to generate the module-based input image signal, and supply the module-based input image signal to a corresponding display device. Therefore, each display device may extract panel image data and edge image data from the input image signal supplied from the image signal generator 910, display the panel image data on the display area of the image display panel, and display the edge image data on the bezel area simultaneously.

Figure 12A:
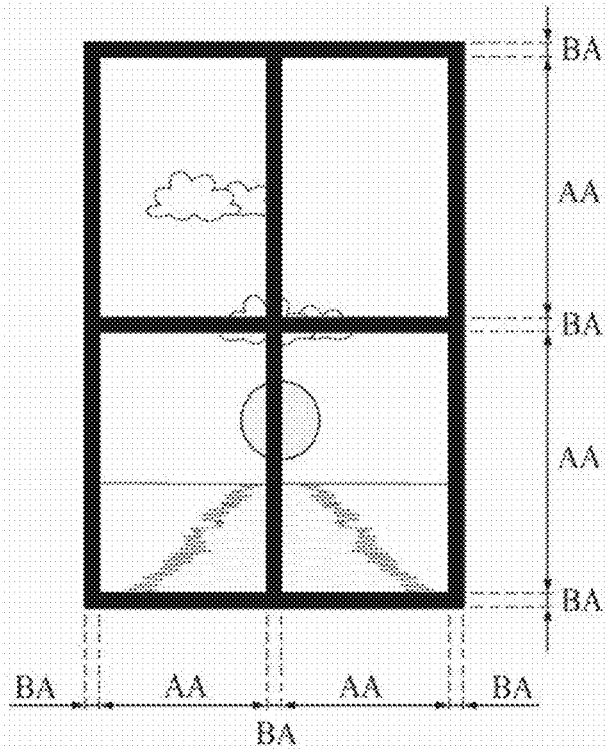
FIGS. 12A and 12B are diagrams illustrating images respectively displayed on a related art multiscreen display device and a multiscreen display device according to an embodiment of the present disclosure.
Figure 12B:
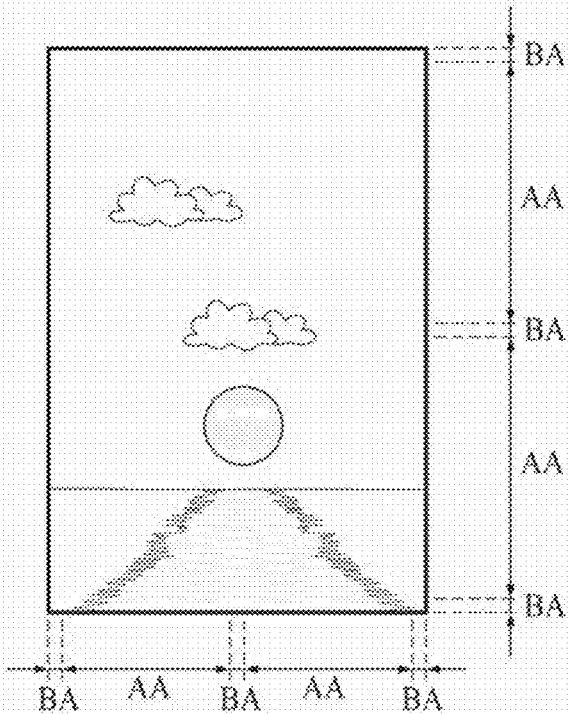

FIGS. 12A and 12B are diagrams illustrating images respectively displayed on a related art multiscreen display device and a multiscreen display device according to an embodiment of the present disclosure.

First, referring to FIG. 12A, in the related art multiscreen display device, it can be seen that since an image is displayed on only on a display area AA of each of a plurality of display devices, a dark portion occurs in a boundary between display devices connected to each other due to each bezel area BA caused by a front case of each of the plurality of display devices, and a discontinued image is displayed on the entire screen due to the dark portion of the boundary.

On the other hand, referring to FIG. 12B, in the multiscreen display device according to the present embodiment, a panel image is displayed on a display area AA of each of a plurality of display devices, and simultaneously, a bezel image is displayed on a bezel area BA of each display device, whereby the bezel area BA of each display device is replaced with a bezel image and thus a dark portion of the bezel area BA is removed. Accordingly, it can be seen that one image is displayed on the entire screen including all the bezel areas.

As a result, in the multiscreen display device according to the present embodiment, since a bezel image is displayed on the bezel area BA of each display device, one image having no discontinuity is displayed on the entire screen including all the bezel areas.

In the embodiments of the present disclosure, it has been described that the backlight unit is configured as a direct type backlight unit, but may be replaced with an edge type backlight unit without being limited thereto. That is, in the embodiments of the present disclosure, by displaying a bezel image on a bezel area which occurs due to an instrument, a zero bezel is realized irrespective of a bezel width, and thus, even though the backlight unit is replaced with the edge type backlight unit of which a bezel width is relatively wide, a zero bezel is realized.

Moreover, in the embodiments of the present disclosure, it has been described that the image display panel is configured with the non-self-emitting pixel, but the present disclosure is not limited thereto. In other embodiments, the image display panel may be replaced with a plasma image display panel or an organic light emitting image display panel which is configured with a self-emitting pixel. In this case, the above-described backlight unit is omitted.

Furthermore, in the embodiments of the present disclosure, it has been described that the front case covering the front edge of the image display module is removed, and the edge display module according to the embodiments of the present disclosure is provided. However, the present disclosure is not limited thereto. In other embodiments, the display device according to the embodiments of the present disclosure may include the front case, and thus, the edge display module according to the embodiments of the present disclosure may be disposed to cover the front case, thereby increasing a rigidity of the edge display module and easily maintaining a planar state of the edge display module. That is, in the embodiments of the present disclosure, an image may be displayed on the bezel area of the display device through the edge display module to conceal the bezel area, and thus, even when the edge display module is disposed to cover the front case, the bezel area caused by the front case is concealed by displaying an image on the edge display module. As a result, in the edge display module according to the embodiments of the present disclosure may be disposed to directly cover the front edge of the display device, or may be disposed to cover the front case which directly covers the front edge of the display device.

As described above, in the display device according to the embodiments of the present disclosure, the bezel area may be concealed when the image display module is driven, and thus, a dark portion occurring in the bezel area is removed, thereby realizing a zero bezel.

In the multiscreen display device according to the embodiments of the present disclosure, since a bezel image is displayed on the bezel area of each of the display devices, one image having no sense of discontinuity is displayed on the entire screen (including the bezel areas).

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display device comprising:
    an image display module including a display area for displaying an image and first to fourth non-display areas surrounding the display area; and
    first to fourth edge display modules configured to display an image on a bezel area overlapping each of the first to fourth non-display areas,
    wherein each of the first to fourth edge display modules comprises:
        a flexible printed circuit board (FPCB) including a first cover part covering a corresponding non-display area, a second cover part bent from the first cover part and disposed on a side surface of the image display module, and a third cover part extending from the second cover part;

a dot light source array including a plurality of dot light source devices provided in the first cover part;

a light source driving circuit unit provided in the third cover part, the light source driving circuit unit configured to drive the plurality of dot light source devices to display an image on the bezel area; and a light guider provided in the first cover part to surround a side surface of each of the plurality of dot light source devices and between two adjacent dot light source devices among the plurality of dot light source devices, wherein the light guider has a height which is lower in position than each of the plurality of dot light source devices, and wherein the light source driving circuit unit comprises:

a light source power generator configured to generate a light source driving voltage based on an input power, and supply the light source driving voltage to each of the plurality of dot light source devices;

a plurality of light source driving integrated circuits (ICs) configured to control a current flowing in each of the plurality of dot light source devices according to light source-based emission data; and an emission data processor configured to receive edge pixel data, classify the received edge pixel data as the light source-based emission data, and supply the light source-based emission data to a corresponding light source driving IC.

2. The display device of claim 1, wherein the FPCB comprises:

a base film including the first to third cover parts;

a driving line layer provided on the base film to have an at least one-layer structure including a line layer and an insulation layer, and connected to each of the plurality of dot light source devices and the light source driving circuit unit; and a passivation layer covering the driving line layer.

3. The display device of claim 2, wherein the passivation layer is provided in the first cover part, or is provided between the first cover part and the third cover part.

4. The display device of claim 2, wherein the third cover part is disposed on a side surface of the image display module, or is disposed on a rear surface of the image display module.

5. The display device of claim 1, wherein the FPCB comprises:

a first rigid area corresponding to the first cover part;

a flexible area corresponding to the second cover part; and a second rigid area corresponding to the third cover part.

6. The display device of claim 2, wherein each of the plurality of dot light source devices comprises a light emitting diode mounted on the first cover part and electrically connected to the driving line layer.

7. The display device of claim 1, further comprising:

a control board including a timing controller generating panel pixel data and the edge pixel data, based on an input image signal; and a panel driving circuit configured to display an image, corresponding to the panel pixel data, on the display area.

8. The display device of claim 1, wherein the light guider comprises a light absorbing material or silicon.

9. The display device of claim 1, further comprising:

a front case covering a front edge of the image display module, wherein each of the first to fourth edge display modules is provided to cover the front case.

10. A multiscreen display device comprising:

a plurality of screen modules; and a plurality of module connecting members connecting side surfaces of the plurality of screen modules, wherein the plurality of screen modules each comprise the display device of claim 1.

11. The multiscreen display device of claim 10, further comprising:

an integrated control board including an image signal generator generating a module-based input image signal which is to be displayed on the display device of each of the plurality of screen modules, based on a raw image signal.

12. The multiscreen display device of claim 10, wherein the FPCB comprises:

a base film including the first to third cover parts;

a driving line layer provided on the base film to have an at least one-layer structure including a line layer and an insulation layer, and connected to each of the plurality of dot light source devices and the light source driving circuit unit; and a passivation layer covering the driving line layer.

13. The multiscreen display device of claim 10, wherein the FPCB comprises:

a first rigid area corresponding to the first cover part;

a flexible area corresponding to the second cover part; and a second rigid area corresponding to the third cover part.

14. The multiscreen display device of claim 10, wherein each of the plurality of dot light source devices comprises a light emitting diode mounted on the first cover part and electrically connected to the driving line layer.

15. A display device comprising:

an image display module including a display area and first to fourth non-display areas surrounding the display area; and first to fourth edge display modules disposed in a bezel area overlapping each of the first to fourth non-display areas, wherein the first to fourth edge display modules each comprise:

a flexible printed circuit board (FPCB) including a first cover part covering a corresponding non-display area and a second cover part bent from the first cover part and disposed on a side surface of the image display module;

a dot light source array including a plurality of dot light source devices provided in the first cover part;

a light guider provided in the first cover part to surround a side surface of each of the plurality of dot light source devices and between two adjacent dot light source devices among the plurality of dot light source devices; and a dot light source driving circuit unit comprising:

a light source power generator configured to generate a light source driving voltage based on an input power, and supply the light source driving voltage to each of the plurality of dot light source devices;

a plurality of light source driving integrated circuits (ICs) configured to control a current flowing in each of the plurality of dot light source devices according to light source-based emission data; and an emission data processor configured to receive edge pixel data, classify the received edge pixel data as the light source-based emission data, and supply the light source-based emission data to a corresponding light source driving IC, wherein the light guider has a height which is lower in position than each of the plurality of dot light source devices.

16. The display device of claim 15, wherein the light guider comprises a light absorbing material or silicon.

17. The display device of claim 15, further comprising:
a front case covering a front edge of the image display module,
wherein each of the first to fourth edge display modules is provided to cover the front case.

* * * * *